(12) United States Patent
Karubian

(10) Patent No.: US 6,190,249 B1
(45) Date of Patent: Feb. 20, 2001

(54) WEASAND CLIP

(76) Inventor: Ralph K. Karubian, 4455 Los Feliz Blvd. #1107, Los Angeles, CA (US) 90027

( * ) Notice: Under 35 U.S.C. 154(b), the term of this patent shall be extended for 0 days.

(21) Appl. No.: 09/512,422

(22) Filed: Feb. 23, 2000

(51) Int. Cl.$^7$ .................................................. A22C 21/00
(52) U.S. Cl. ............................................ 452/176; 24/339
(58) Field of Search ............................. 452/176; 138/89; 24/327, 339, 487

(56) References Cited

U.S. PATENT DOCUMENTS

| | | | |
|---|---|---|---|
| 4,127,917 | 12/1978 | Pohio et al. | 452/129 |
| 4,210,677 | 7/1980 | Huffman | 426/272 |
| 4,258,068 | 3/1981 | Huffman | 426/272 |
| 4,320,557 | 3/1982 | Speedie | 452/106 |
| 4,343,066 | 8/1982 | Lance | 452/106 |
| 4,502,186 | * 3/1985 | Clarke et al. . | |
| 5,062,820 | 11/1991 | Rankin et al. | 452/187 |
| 5,087,222 | 2/1992 | Sterling et al. | 452/127 |
| 5,118,215 | * 6/1992 | Freler | 403/405.1 |
| 5,139,457 | 8/1992 | Rankin et al. | 452/160 |
| 5,195,923 | 3/1993 | Rankin et al. | 452/64 |
| 5,312,292 | 5/1994 | Rankin et al. | 452/160 |
| 5,384,936 | * 1/1995 | Van Walraven | 24/279 |
| 5,600,573 | 2/1997 | Hendricks et al. | 364/514 R |
| 5,618,015 | * 4/1997 | Morini | 248/74.2 |
| 5,830,053 | 11/1998 | Vick et al. | 452/176 |

FOREIGN PATENT DOCUMENTS 1108359  9/1981  (CA) .

* cited by examiner

*Primary Examiner*—Willis Little
(74) *Attorney, Agent, or Firm*—Christie, Parker & Hale, LLP

(57) ABSTRACT

A weasand clip used to close the weasand (oesophagus) of slaughtered animals has a leading edge with a sharply configured knife edge for breaking the sinews and membranes along the exterior length of the weasand in a single stroke of the rodder used to push the closed clip along the weasand to a sealed position protecting against leakage of ingesta into the weasand.

5 Claims, 4 Drawing Sheets

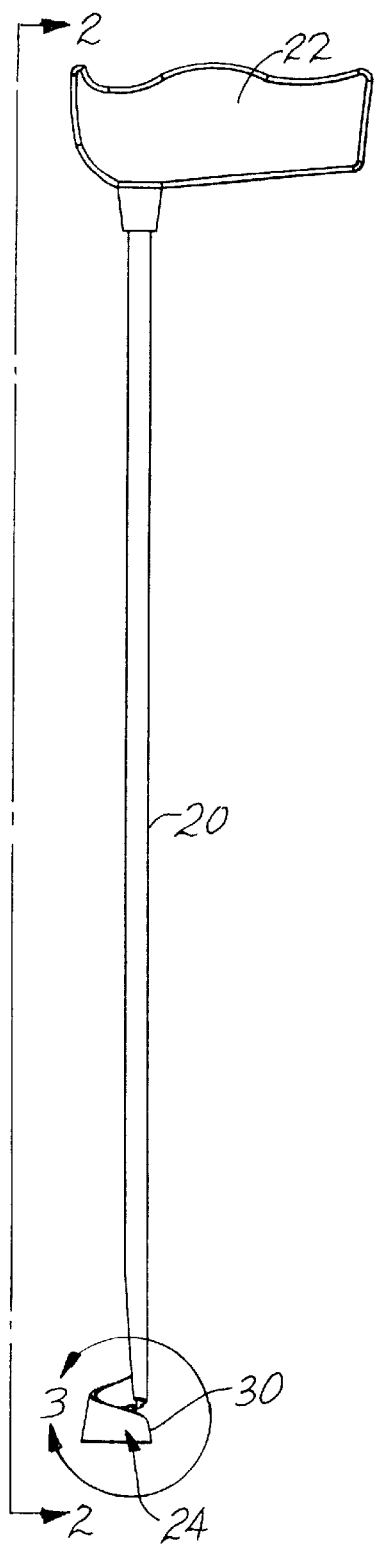
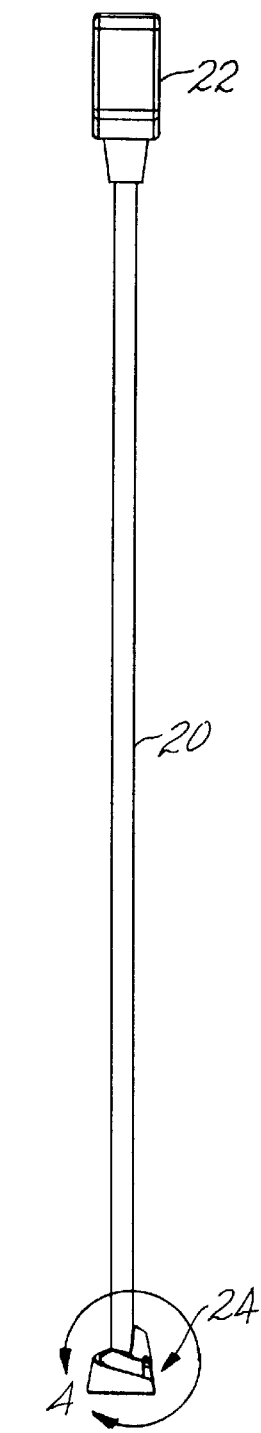
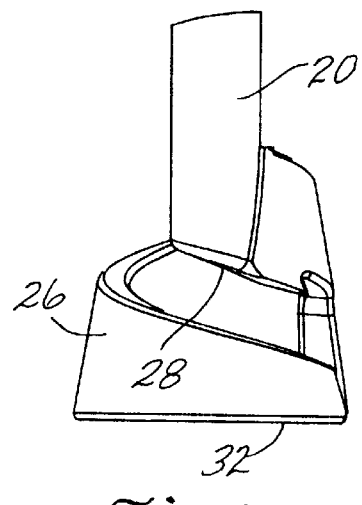
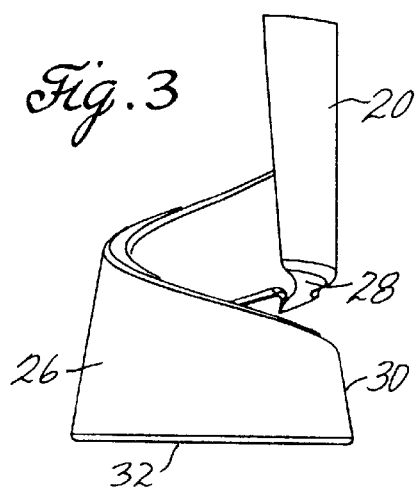
Fig.1
Fig.2
Fig.3
Fig.4

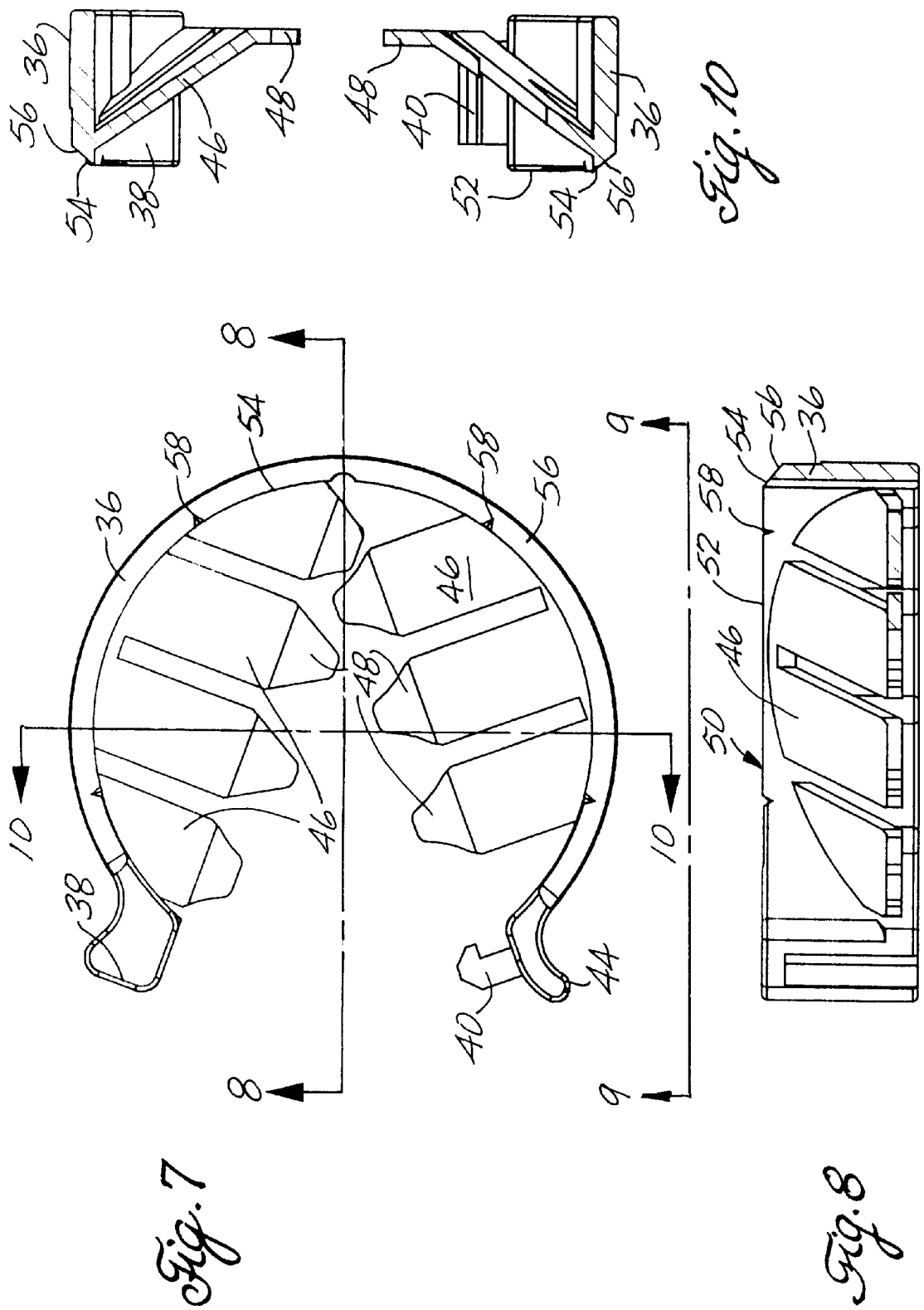

WEASAND CLIP

FIELD OF THE INVENTION

This invention relates to a clip used to close the weasand (oesophagus) of slaughtered animals such as cattle or sheep. More particularly, the invention comprises a weasand clip structured so that the clip can be moved to a sealed position on the weasand with a single stroke of the tool used to slide the clip along the weasand to a sealed position.

BACKGROUND OF THE INVENTION

In the meat packing industry standard common practice is to suspend cattle or sheep in an upside down position and to then close off the weasand, the tube (also know as the oesophagus) connecting the throat of the animal to its stomach or paunch. The weasand is closed off to prevent the contents of the stomach, or ingesta, from causing contamination from leakage of the stomach contents once the weasand is cut.

A common practice for closing off the weasand includes use of a tool called a rodder which is used to push the weasand clip to the closed or sealed position. In use, the rodder slips around the outside of the weasand and then two strokes of the rodder are required. The first stroke is necessary for the rodder to cut the sinews or membranes attached to the outside of the weasand to clear the way for the second step of moving the clip to the sealed position. After the first stroke the rodder is retracted, and the clip is then locked around the weasand in front of the rodder prior to the second stroke in which the clip is moved to the sealed position.

One weasand clip commonly used today comprises a flexible plastic split ring made by ADEPT Limited of Auckland, New Zealand. This weasand clip has a generally C-shaped base with flexible teeth projecting into the interior of the clip. When the ends of the clip are locked around the weasand, the flexible teeth apply pressure to seal off the weasand. After the first stroke of the rodder is used to clear the vicinity of the weasand, the second stroke of the rodder is used to force the closed ring up along the length of the weasand. The flexible teeth maintain a sliding seal when the ring is pushed along the weasand to the closed or sealed position in the vicinity of the stomach or paunch. The sliding seal provided by the locked weasand clip pushes any ingesta contained in the weasand back into the stomach of the animal.

The present invention is based on the recognition that a properly structured weasand clip can be used to cut the sinews or membranes along the length of the weasand while at the same time maintaining a sliding seal as the clip is pushed up along the length of the weasand by the rodder. Thus, only a single stroke of the rodder is necessary to clear the weasand-attached sinews and move the weasand clip to the sealed or closed position once the weasand is initially exposed. By reducing the amount of work required to seal off the weasand, worker fatigue is greatly reduced and production rate is increased.

The present invention is also based on the recognition that the weasand clip must be strong enough to both clear the weasand area while at the same time maintaining a reliable seal in a single stroke of the rodder, without structural failure to the weasand clip. A weasand clip made from a strong plastic material may be unsuitable since it can be brittle and prone to cracking or other fatigue failure.

SUMMARY OF THE INVENTION

The present invention comprises a weasand clip used to close the weasand (oesophagus) of slaughtered animals. The clip has a leading edge with a sharply configured knife edge for breaking the sinews or membranes along the length of the weasand in a single stroke of the rodder used to push the closed clip along the weasand to the sealed position protecting against leakage of ingesta into the weasand.

Briefly, one embodiment of the weasand clip comprises a unitary piece of flexible plastic material in which the clip has a base of generally C-shaped configuration with an open end, in an open position of the clip. The base has an outside wall, an inside wall facing toward an interior region of the base, and a pair of first and second locking ends at the open end of the base adapted for locking engagement for holding the clip in a closed ring configuration in the locked position. A first and second set of flexible teeth integrally formed with the inside wall of the base project into the interior region and are adapted for interlocking when the clip is moved to the locked position. The base has a leading edge at an end of the base facing away from the direction in which the teeth project. A knife edge is formed integrally with and projects away from the leading edge of the base. The knife edge is sufficiently sharp and positioned so as to break sinews and membranes present along the exterior length of the weasand when the clip is held in its locked position around the weasand and is pushed up along the length of the weasand in a single stroke with the interlocking flexible teeth trailing the knife edge.

In one embodiment of the invention the weasand clip is made from a soft, flexible plastic material such as polypropylene which avoids breakage problems common with the prior art weasand device described above, while also maintaining the weasand clip at a sufficient level of strength to enable the clip to be moved to the sealed position in a single stroke of the rodder.

These and other aspects of the invention are more fully understood by referring to the following detailed description and the accompanying drawings.

DESCRIPTION OF THE DRAWINGS

FIG. 1 is an elevational view showing a prior art rodder device.

FIG. 2 is an side elevational view taken on line 2—2 of FIG. 1.

FIG. 3 is an enlarged fragmentary elevational view taken within the circle 3 of FIG. 1.

FIG. 4 is an enlarged fragmentary elevational view taken within the circle 4 of FIG. 2.

FIG. 7 is a top elevational view of the weasand clip shown in FIGS. 5 and 6.

FIG. 8 is a cross-sectional view taken on line 8—8 of FIG. 7.

FIG. 10 is a cross-sectional view taken on line 10—10 of FIG. 7.

DETAILED DESCRIPTION

Figure 5:
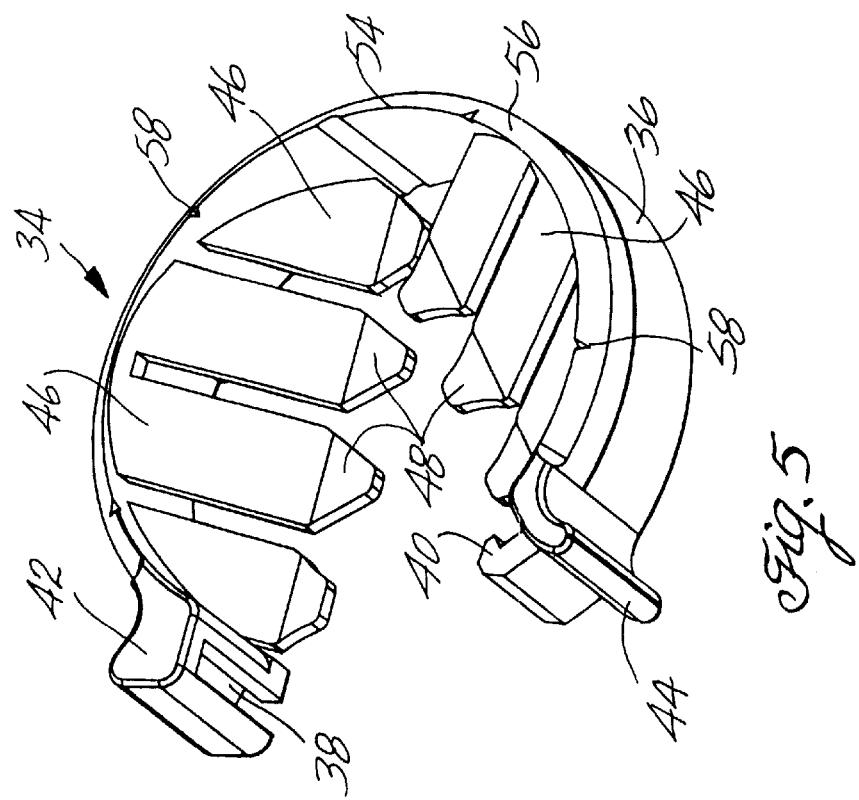
FIG. 5 is a top perspective view showing a weasand clip according to principles of this invention.
Figure 6:
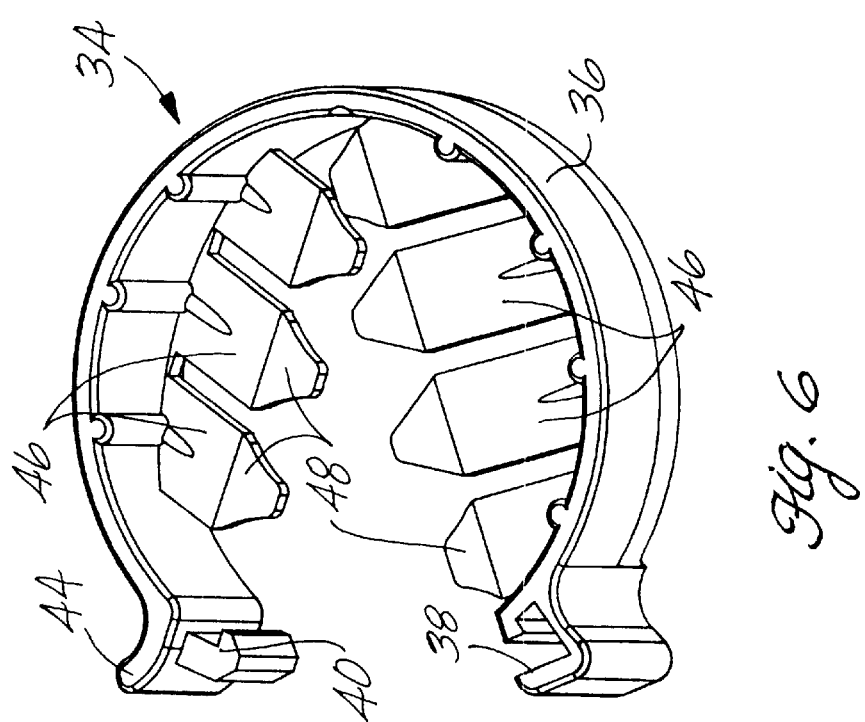
FIG. 6 is a bottom perspective view of the weasand clip shown in FIG. 5.

FIGS. 1 through 4 illustrate a prior art rodder used for moving a weasand clip into a sealed position closing off the weasand adjacent to the stomach or paunch of slaughtered animals such as cattle or sheep. The rodder comprises an elongated metal shaft 20, a handle 22 at one end of the shaft, and a generally spiral-shaped head 24 at the other end of the metal shaft. The spiral-shaped head is formed by a split ring 26 shaped as a narrow wall that projects outwardly from and spirals downwardly (when the rodder is viewed in the orientation shown in FIGS. 1 through 4) away from an end 28 of the shaft. An end 30 of the ring spaced below the bottom end 28 of the shaft forms an open space inside the spiral-shaped ring for receiving the weasand. The ring also has a flat edge 32 that confronts the weasand clip of this invention when the weasand clip is pushed upwardly along the weasand by the head of the rodder.

The rodder shown in FIGS. 1 through 4 is an example only of a tool that can be used with the weasand clip of this invention, inasmuch as other rodder configurations also can be used with the present invention insofar as they are capable of encompassing the weasand, contacting the weasand clip and being used to force the weasand clip upwardly along the length of the weasand in a single stroke as described below.

Figure 11:
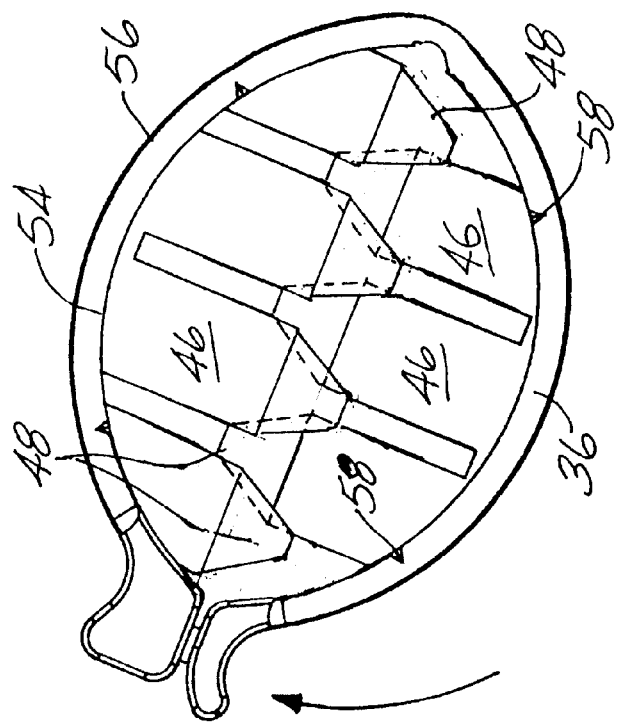
FIG. 11 is a top elevational view similar to FIG. 7 but showing the clip in a closed position.
Figure 9:
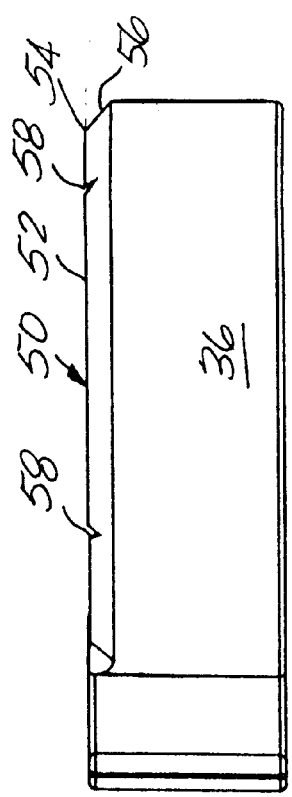
FIG. 9 is an elevational view taken on line 9—9 of FIG. 7.

FIGS. 5 through 10 illustrate an open position of a weasand clip 34 according to this invention. The weasand clip comprises a unitary piece of flexible plastic material in which the clip includes a base 36 shaped as a generally C-shaped thin upright wall. The open end of the base has a pair of locking devices adapted to interlock when moving the bendable clip to the locked position shown in FIG. 11. The locking ends of the base preferably comprise an upright groove 38 at one end of the base and a cooperating shoulder 40 projecting from the other end of the base. A top wall 42 closes off one end of the groove 38. The flexibility of the base is sufficient to allow bending of the base so that the top of the shoulder can be aligned with the open bottom of the groove and the shoulder pushed upwardly into the groove to interlock the ends of the base. A tab 44 flairs outwardly from one end of the base adjacent the shoulder to cradle the thumb and assist in aligning and locking the shoulder with the groove.

Separate rows of flexible teeth 46 are integrally formed with the inside wall of the base. The teeth project into an interior region of the ring formed by the base of the clip. The flexible teeth project downwardly at an angle generally in the same plane toward the center of the clip, terminating in flat ends 48 generally in alignment in a flat plane. The flat ends of the flexible teeth are interleaved when the flexible base is moved into its closed locked position illustrated in FIG. 11. In the locked position the teeth of the flexible clip close off the interior of the weasand clip to prevent passage of ingesta contained in the weasand. The angular orientation of the teeth 46 is sufficient to allow the weasand clip, in its closed position, to be moved in one direction along the length of the weasand while maintaining a sealed condition of the weasand, whereas the clip is prevented from movement along the weasand in the opposite direction by the flexible teeth.

The C-shaped base 36 of the weasand clip has a leading edge 50 at the end of the base away from which the flexible teeth project. A knife edge 52 is integrally formed with the base along the leading edge of the base. The knife edge extends essentially continuously along the leading edge so that the knife edge 52 forms an essentially closed ring when the clip is moved to the closed position illustrated in FIG. 11. The knife edge has a sharp apex 54 aligned above the C-shaped wall of the clip. Preferably, and as shown in the drawings, the apex 54 of the knife edge is aligned with and generally continuous with the inside wall of the base. The knife edge also includes an angular outside face 56 which tapers downwardly away from the apex to the outside wall of the base.

V-shaped notches 58 are circumferentially spaced apart around the knife edge to assist in holding and breaking the sinews attached to the weasand as the clip is pushed up toward the stomach or paunch.

In alternative embodiments (not shown) the apex of the knife edge can be positioned generally centrally above the wall thickness of the base, or the knife edge can taper upwardly and outwardly to an alignment with the outer face of the base, if desired.

To best appreciate use of the present invention, the present practice of using the prior art weasand clip will first be described. The slaughtered animal is hung in an upside down position with the stomach or paunch at the top. With a knife cut, the weasand is exposed behind the windpipe. The weasand is not cut. The weasand is then pulled free and slipped into the ring at the head of the rodder. Holding the shaft of the rodder, the head of the rodder is pushed up along the entire length of the weasand to the area of the stomach or paunch. This first step in the process is used to break sinews and membranes attached along the external side of the weasand. The rodder is then retracted, sliding it downwardly along the length of the weasand to its initial position. The head of the rodder stays on the weasand. The weasand clip is then placed around the weasand in front of the rodder head. The flexible teeth in the clip are allowed to deflect downwardly as the locking ends of the clip are engaged to lock the clip as a ring tightly around the weasand. This closes off the interior of the weasand against leakage of ingesta past the closed ring. The rodder is then used to push the closed ring upwardly along the weasand to the area of the stomach or paunch where the clip seals the weasand against leakage. The rodder then can be removed from the weasand.

The present invention avoids this two-step process of first clearing the weasand and then moving the weasand clip along the weasand to the closed position. The weasand clip of the present invention allows this entire process to be accomplished in a single stroke of the rodder and clip. The knife edge at the leading edge of the weasand clip can be used in a single stroke of the rodder to break the sinews and membranes along the length of the weasand while at the same time the weasand clip forms a sliding seal along the length of the weasand to the closed sealed position adjacent the stomach or paunch.

The user of the present invention is subjected to less fatigue and stress because the first step of rodding to clear the weasand is avoided in each instance. In the prior art weasand clip, the leading edge of the clip has an essentially rounded leading edge which is not sufficient to cut sinews or membranes and therefore requires two separate rodding steps. In the present invention, the knife edge is made as sharp as possible given the type of plastic material used. In one embodiment, the height of the knife edge is about $\frac{1}{16}$ inch above the juncture between the tops of the teeth where they intersect the inside wall of the base. The presently preferred material for making the weasand clip is a high melting point polypropylene homopolymer with a product designation 3825, available from Fina Manufacturing Company. The prior art weasand clip described above is made from a polyester material known as Arnite T06 202. This material has been found to be strong but is too brittle during use, making the clip prone to fracturing and breaking. In use, the teeth of the prior art clip have been found to be too stiff, and therefore, the clip must be heated (in hot water) to an elevated temperature sufficient to soften the material for proper use. The polypropylene material from which the present invention is made is sufficiently flexible to avoid fatigue and stress fracturing, even under the loading imposed by use in a single stroke of the rodder. The material also has a high melt point in excess of rendering temperatures. The material is FDA approved and is a fraction of the cost of the polyester material from which the prior art clip is made.

I claim:

1. A weasand clip for closing the flexible tubular weasand of an animal, the clip comprising a unitary piece of flexible plastic material, the clip having a base of generally C-shaped configuration with an open end, in an open position of the clip; the base having an outside wall, an inside wall facing toward an interior region of the base, and a pair of first and second locking ends at an open end of the base adapted for locking engagement for holding the clip as a closed ring in a locked position; a first and second set of flexible teeth integrally formed with the inside wall of the base on opposite sides of said interior region, the flexible teeth projecting into said interior region and adapted for interlocking when the clip is held in a locked position; the base further including a leading edge at an end of the base conforming to the C-shaped configuration of the base at an end thereof away from which the teeth project; and a knife edge formed integrally with and projecting away from the leading edge of the base, the knife edge being sufficiently sharp and positioned so as to break sinews and membranes present along the exterior length of the weasand when the clip is held in its locked position around the weasand and pushed with a single stroke along the length of the weasand with the interlocked flexible teeth trailing the knife edge.

2. Apparatus according to claim 1 in which the clip is made of polypropylene.

3. Apparatus according to claim 1 in which the knife has an apex at the leading edge of the base generally aligned with the inside wall of the base with an angled surface projecting away from the apex to the outer wall of the base.

4. Apparatus according to claim 1 in which the knife edge tapers forwardly to a sharp apex aligned above the base and in which the apex conforms generally to the C-shaped configuration of the base.

5. Apparatus according to claim 1 in which the knife edge includes circumferentially spaced apart notches.

* * * * *